(12) United States Patent
Kayahara

(10) Patent No.: US 11,697,290 B2
(45) Date of Patent: Jul. 11, 2023

(54) PRINTING APPARATUS AND PRINTING METHOD

(71) Applicant: SEIKO EPSON CORPORATION, Tokyo (JP)

(72) Inventor: Naoki Kayahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 17/104,070

(22) Filed: Nov. 25, 2020

(65) Prior Publication Data

US 2021/0162776 A1    Jun. 3, 2021

(30) Foreign Application Priority Data

Nov. 28, 2019    (JP) ................................ 2019-215701

(51) Int. Cl.
*B41J 3/407*    (2006.01)
*B41J 3/54*    (2006.01)
*B41J 15/16*    (2006.01)

(52) U.S. Cl.
CPC ............. *B41J 3/4078* (2013.01); *B41J 3/543* (2013.01); *B41J 15/165* (2013.01)

(58) Field of Classification Search
None
See application file for complete search history.

(56) References Cited

U.S. PATENT DOCUMENTS

| 10,011,122 | B2 * | 7/2018 | Mashima | B41J 11/14 |
| 10,363,735 | B2 * | 7/2019 | Morikawa | B41J 2/2103 |
| 2003/0030686 | A1 | 2/2003 | Abe et al. | |
| 2015/0283825 | A1 * | 10/2015 | Takai | G06F 3/1256 347/9 |

FOREIGN PATENT DOCUMENTS

| JP | H11-300948 A | 11/1999 |
| JP | 2007-313717 A | 12/2007 |

* cited by examiner

*Primary Examiner* — Alejandro Valencia
(74) *Attorney, Agent, or Firm* — Global IP Counselors, LLP

(57) ABSTRACT

A printing apparatus includes a control unit configured to execute image processing including a division and a combination of image data, and a printing unit configured to perform printing on a printing medium based on image data after the image processing, wherein the control unit acquires image data as a target of the n-th image processing, generates an upper image whose lower side is horizontal, and a lower image whose upper side is horizontal by dividing the image data by a horizontal line, generates combined image data whose upper side and lower side are horizontal by combining a lower image whose upper side is horizontal and that is generated by the division in the image processing at the (n−1)-th time, on the upper side of the upper image, and causes the printing unit to execute printing based on the combined image data.

3 Claims, 7 Drawing Sheets

PRINTING APPARATUS AND PRINTING METHOD

The present application is based on, and claims priority from JP Application Serial Number 2019-215701, filed Nov. 28, 2019, the disclosure of which is hereby incorporated by reference herein in its entirety.

BACKGROUND

1. Technical Field

The present disclosure relates to a printing apparatus and a printing method.

2. Related Art

An image forming device is disclosed that uses a recording medium having tile-shaped dividing line formed on the surface, determines the distortion of the transported recording medium by detecting the dividing line by a sensor, executes a correction processing on image data according to the result of the determination, and performs image formation according to the corrected image data. (see JP-A-11-300949).

A printing unit configured to perform printing base on the image data repeatedly acquires an image of a certain shape as a processing unit for printing, and prints to the printing medium. However, when printing is executed based on the image data having a distortion in shape due to correction or the like, there are problems in that an image having a distortion shape that is not the certain shape is provided to the printing unit and in that the quality of the printing is difficult to be maintained.

SUMMARY

A printing apparatus includes a control unit configured to execute image processing including a division and a combination of image data, and a printing unit configured to perform printing on a printing medium based on image data after the image processing, wherein the control unit acquires image data as a target of the n-th image processing, generates an upper image whose lower side is horizontal, and a lower image whose upper side is horizontal by dividing the image data by a horizontal line, generates combined image data whose upper side and lower side are horizontal by combining a lower image whose upper side is horizontal and that is generated by the division in the image processing at the (n−1)-th time, on the upper side of the upper image, and causes the printing unit to execute printing based on the combined image data.

DESCRIPTION OF EXEMPLARY EMBODIMENTS

Embodiments of the present disclosure will be described below with reference to the diagrams. Note that each of the diagrams is merely illustrative for describing the present embodiment. Since the drawings are illustrations, the ratio and the shape may be inaccurate, and maybe not match each other, sometimes may be partially omitted.

Figure 1:
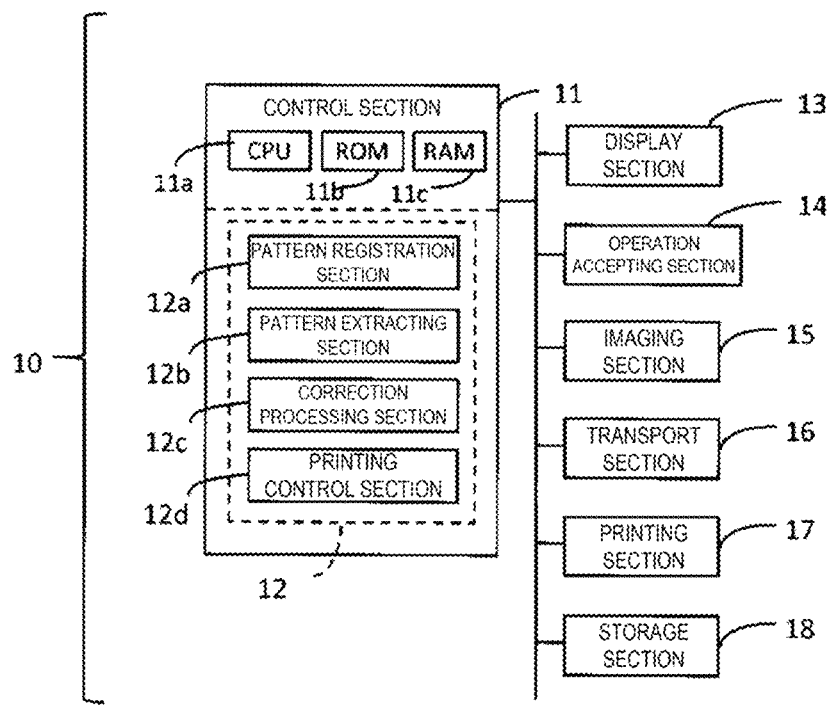
FIG. 1 is a block diagram simply illustrating a configuration of a printing apparatus.

1. Device Configuration:

FIG. 1 simply illustrates a configuration of a printing apparatus 10 according to the present embodiment.

The printing apparatus 10 executes a printing method. The printing apparatus 10 includes a control unit 11, a display unit 13, an operation accepting unit 14, an imaging unit 15, a transport unit 16, a printing unit 17, a storage unit 18, and the like. The control unit 11 is configured to include one or more ICs having CPU 11a as a processor, ROM 11b, and RAM 11c, and the like, and other non-volatile memory, and the like.

In the control unit 11, the processor or, in other words, the CPU 11a controls the printing apparatus 10 by executing calculation processing according to one program 12 or more stored in the ROM 11b, and other memories, or the like, using the RAM 11c or the like as a work area. The control unit 11 functions as a pattern registration unit 12a, a pattern extracting unit 12b, a correction processing unit 12c, a printing control unit 12d, and the like by following the program 12. Note that the processor is not limited to a single CPU, and may be a configuration in which processing is executed by a hardware circuit such as a plurality of CPUs, an ASIC, or the like, or a configuration in which the CPU and the hardware circuit cooperate to execute processing.

The display unit 13 is a unit configured to display visual information, and is configured by, for example, a liquid crystal display, an organic electroluminescence display, or the like. The display unit 13 may be configured to include a display and a drive circuit configured to drive the display. The operation accepting unit 14 is a unit configured to accept the operation by user, and is realized by, for example, a physical button, a touch panel, a mouse, a keyboard, or the like. Of course, the touch panel may be realized as a function of the display unit 13. The display unit 13 and the operation accepting unit 14 may be part of the configuration of the printing apparatus 10, but may be a peripheral device external to the printing apparatus 10.

The transport unit 16 is a mechanism configured to transport a printing medium under control by the control unit 11. Here, as a printing medium, a jacquard woven clothing fabric and clothing fabric in which a three-dimensional pattern is formed by devising a weaving method of a yarn, such as a lace clothing fabric are assumed. Such a clothing fabric is formed such that one or a set of some patterns are repeatedly arranged. In the following, one or a set of such patterns is treated as one pattern.

The transport unit 16 has a configuration such as a delivery roller delivering the clothing fabric before printing wound into a roll to the downstream of the transport, a belt or a roller configured to further transport the delivered clothing fabric, a windup roller configured to wind and take back the printed clothing fabric in a roll shape again, a motor configured to cause each roller or belt to rotate, or the like.

In the following, the upstream and downstream of the transport direction by the transport unit 16 are described simply as upstream and downstream.

The imaging unit 15 images the image of clothing fabric transported by the transport unit 16 under control by the control unit 11. The imaging unit 15 has a configuration such as a light source that irradiates the clothing fabric, an imaging element configured to receive reflected light from the clothing fabric, and generate and output image data as an imaging result.

The printing unit 17 executes printing on the clothing fabric transported by the transport unit 16 under the control of the control unit 11. The printing unit 17 is disposed downstream of the imaging unit 15. The printing unit 17 performs printing on the clothing fabric based on the printing data transmitted from the control unit 11. The printing unit 17 can execute printing by discharging ink having a plurality of colors such as cyan (C), magenta (M), yellow (Y), black (K), and the like, by an ink-jet method. According to the ink-jet method, the printing unit 17 executes the printing to the clothing by discharging ink dots from nozzle (not illustrated) based on the printing data in which a dot on or a dot off is defined for each pixel.

The storage unit 18 is a storage unit such as a non-volatile memory, a hard disk drive, and the like. The storage unit 18 may be understood as a part of the control unit 11. Additionally, the RAM 11c may be understood as a part of the storage unit 18.

The printing apparatus 10 may be referred to as a recording apparatus, an image forming apparatus, a printer, or the like. The printing apparatus 10 may be not only realized by a single independent apparatus, but also may be realized by a plurality of apparatuses communicatively connected to each other via a communication interface or a network. The printing apparatus 10 configured by a plurality of apparatuses may be referred to as a printing system 10.

The printing system 10 is configured to include, for example, one information processing device or more functioned as the control unit 11, and a printer including the imaging unit 15, the transport unit 16, and the printing unit 17. The information processing device is, for example, a personal computer (PC), a server, a smart-phone, a tablet terminal, or a device having the same degree of processing capability as above. In the printing system 10, a device that serves the control unit 11 may be referred to as an image processing device, a printing control device, or the like. Of course, some of the devices constituting the printing system 10 may be regarded as a disclosure.

Figure 2A:
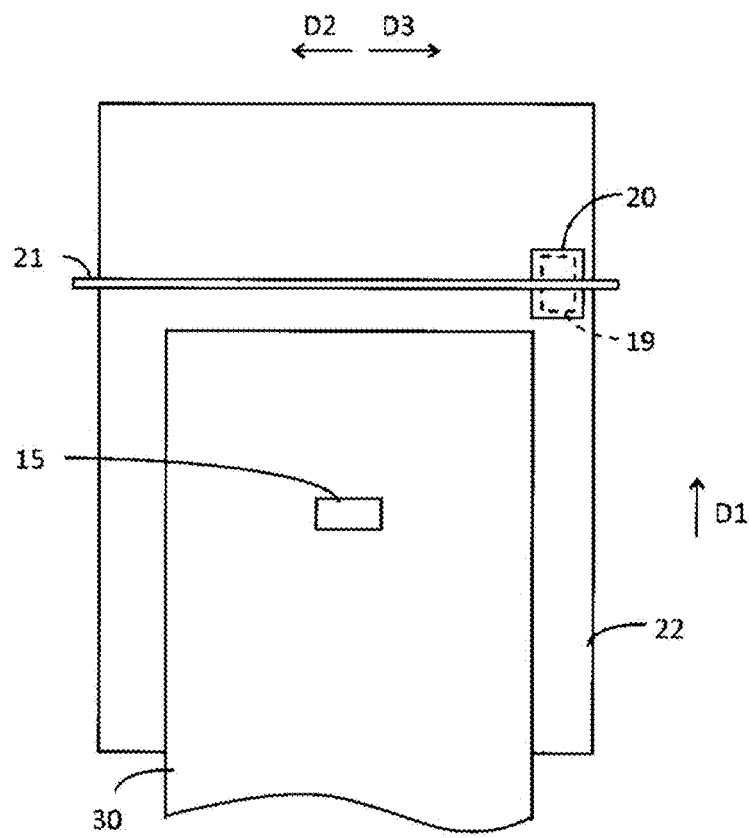
FIG. 2A is a diagram illustrating a configuration of a clothing fabric to be transported and a configuration of the vicinity of the clothing fabric in a perspective facing downward from above.

FIG. 2A illustrates a configuration of a clothing fabric 30 to be transported and a configuration of vicinity of clothing fabric 30 in a perspective facing downward from above. In FIG. 2A, the depiction of the patterns formed in advance on the clothing fabric 30 is omitted. In FIG. 2A, the transport direction of the clothing fabric 30 by the transport unit 16 is indicated by sign D1. Sign 22 denotes an endless belt 22 as a part of the transport unit 16. The clothing fabric 30 placed on the endless belt 22 is transported downstream from upstream in the transport direction D1 by the rotation of the endless belt 22.

As illustrated in FIG. 2A, a carriage 20 is disposed above the endless belt 22. The carriage 20 is movable in directions D2 and D3 that are intersect the transport direction D1. The intersection mentioned here is orthogonal, but the intersection can be understood not only as strictly orthogonal but also as an error occurring in the manufacture of the product. The carriage 20 moves along the elongated guide part 21 in the directions D2 and D3 that are intersect the transport direction D1. The directions D2 and D3 are opposite to each other, and one of the directions D2 and D3 can be interpreted as a forward movement direction of the carriage 20 and the other can be interpreted as a backward movement direction of the carriage 20.

The carriage 20 includes a print head 19. In other words, the print head 19 moves with the carriage 20 in the direction D2 and the direction D3. The directions D2 and D3 are referred to as the "main scanning direction" and are referred to as the "width direction". The carriage 20 and the print head 19 as described above constitute the printing unit 17. Although not illustrated, the printing head 19 opens a plurality of nozzles on the lower surface opposite the endless belt 22. The print head 19 discharges ink from the nozzles based on the printing data while moving with the carriage 20 in the direction D2 and the direction D3. The operation of discharging ink from the nozzle while the print head 19 moves in the direction D2 and the direction D3 is referred to as a "main scanning", or referred to as a "pass".

As illustrated in FIG. 2A, the imaging unit 15 is disposed above the endless belt 22 at a predetermined position upstream of the carriage 20 and the print head 19.

Figure 2B:
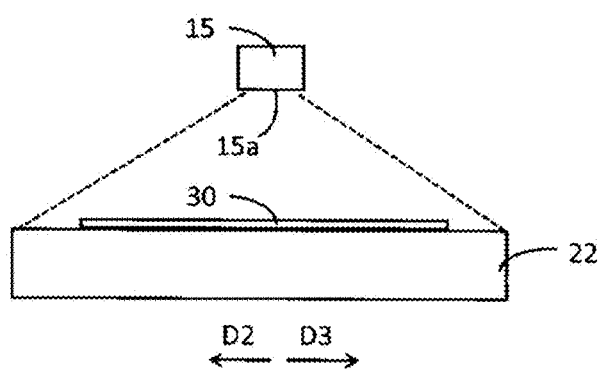
FIG. 2B is a diagram illustrating a portion of the configuration illustrated in FIG. 2A in a perspective from the upstream side to the downstream side.

FIG. 2B illustrates a portion of the configuration illustrated in FIG. 2A with a point of view from upstream to downstream. The imaging unit 15 has a lower surface opposite the endless belt 22 as an imaging surface 15a, and images the clothing fabric 30 on the endless belt 22 via the imaging surface 15a. The imaging unit 15 is, for example, a line scan type camera in which a plurality of imaging elements are arranged along the width directions D2 and D3 within the camera. The imaging unit 15 repeats the imaging of the line unit via a lens and an imaging element (not illustrated) provided on the imaging surface 15a. In FIG. 2B, the imaging range of the imaging unit (imaging unit) 15 in the width directions D2 and D3 is illustrated by a dashed line. The imaging unit 15 is capable of imaging approximately the entire range of the endless belt 22 in the width directions D2 and D3 due to the function of the lens.

The configuration of the imaging unit 15 is not limited to the examples of FIG. 2A and FIG. 2B. For example, a configuration may be adopted in which the plurality of imaging units 15 are arranged along the width directions D2 and D3 above the endless belt 22, and each of the plurality of imaging units 15 respectively share a part of the whole range of the endless belt 22 in the width directions D2 and D3 to execute imaging. Alternatively, the imaging unit 15 may be a line sensor configured to arrange a plurality of imaging elements over approximately the entire range of the endless belts 22 in the width directions D2 and D3. Alternatively, the imaging unit 15 may be mounted on a carriage that is movable along the width directions D2 and D3, as well as that in which the print head 19 is mounted on the carriage 20, and may be configured to image an image on the endless belt 22 while moving in the width directions D2 and D3 by the carriage.

Figure 3:
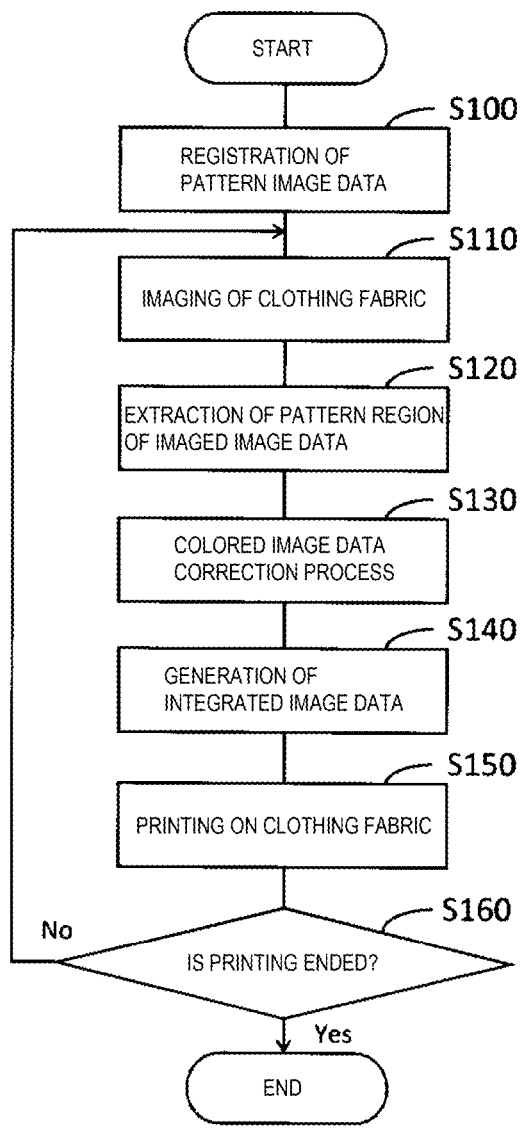
FIG. 3 is a flowchart illustrating a printing processing.

2. Printing Method:

FIG. 3 is the printing processing in which the control unit 11 executes according to the program 12 illustrated by a flowchart.

In step S100, the pattern registration unit 12a of the control unit 11 registers the pattern image data representing the pattern formed on the clothing fabric 30 into the storage unit 18. The pattern image data corresponds to the "first image data", and step S100 corresponds to the registration step.

Figure 4:
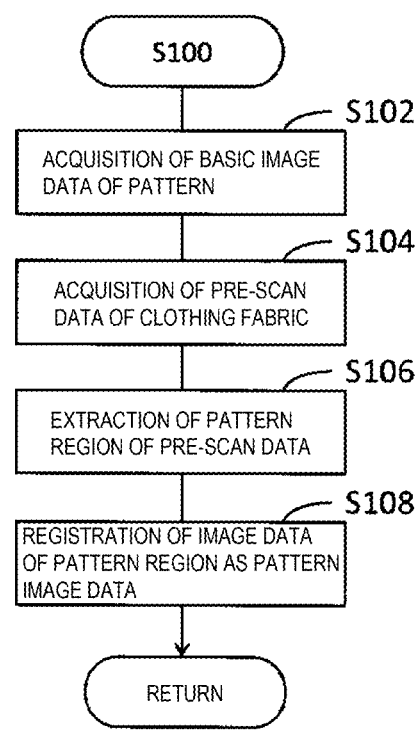
FIG. 4 is a flowchart illustrating details of step S100.

FIG. 4 illustrates the details of step S100 by a flowchart.

First, in step S102, the pattern registration unit 12*a* acquires basic image data representing the pattern of the clothing fabric 30. The clothing fabric 30 may be, for example, a textile of a repeating weave pattern designed by a designer. Therefore, it is assumed that the basic image data is image data representing the pattern that has been generated in advance using predetermined software for design or drawing. For example, from a PC external to the printing apparatus 10, the pattern registration unit 12*a* inputs basic image data stored in the PC according to the user operation, and stores the inputted base image data in the storage unit 18.

In step S104, the pattern registration unit 12*a* acquires pre-scan data, which is the image data generated by the pre-scan of the fabric 30. Pre-scan means a reading or imaging that is executed prior to imaging of the clothing fabric 30 according to step S110 described below. For example, a user may scan the clothing fabric 30 on a scanner external to the printing apparatus 10 in advance. Then, the pattern registration unit 12*a* inputs the image data generated by this scan from the scanner and stores the image data as pre-scan data in the storage unit 18.

Alternatively, the pre-scan may be executed by the imaging unit 15. For example, the control unit 11 starts the transport of the clothing fabric 30 in the transport unit 16, and stops the transport of the clothing fabric 30 at a timing at which the head of the clothing fabric 30 has been reached to a position downstream from the imaging unit 15 by a predetermined distance. The head of the clothing fabric 30 is the end facing downstream of the clothing fabric 30. The imaging unit 15 images the clothing fabric 30 passing under the imaging unit 15 by transport, and the pattern registration unit 12*a* inputs image data generated by the imaging from the imaging unit 15 and stores the image data as pre-scan data in the storage unit 18.

In step S106, the pattern registration unit 12*a* compares the base image data acquired in step S102 with the pre-scan data acquired in step S104, and extracts a pattern region corresponding to one pattern of the clothing fabric 30 from the pre-scan data. At this time, the pattern registration unit 12*a* uses the image recognition technology to extract image regions with higher similarity with the basic image data in the pre-scan data, and makes the image region as the pattern region.

Then, in step S108, the pattern registration unit 12*a* stores image data corresponding to the pattern region extracted in step S106 as pattern image data in the storage unit 18. As described above, the registration of the pattern image data is ended.

According to the description of FIG. 4, the pattern image data can be said to be at least a portion of the pre-scan data.

However, the pattern registration unit 12*a* may simplify the step S100 by registering the basic image data itself with the storage unit 18 as pattern image data.

Return to the description of FIG. 3.

In step S110, the control unit 11 causes the imaging unit 15 to image the clothing fabric 30. Step S110 corresponds to an imaging step. The region of the clothing fabric 30 that is imaged in one step S110 is referred to as the "target region". For example, the length in the width directions D2 and D3 of the target region is the length in the width directions D2 and D3 of the clothing fabric 30, and the length in the transport direction D1 of the target region is a length including a predetermined number of the size of the pattern image data in the transport direction D1.

The control unit 11 controls the transport unit 16, and clothing fabric 30 is transported such that the area of the target region of clothing fabric 30 passes below the imaging unit 15. Then, the imaging unit 15 generates the imaged image data as an image result of a single target region by imaging the transported clothing fabric 30. The imaged image data corresponds to the "second image data".

Although not specifically illustrated in the flowchart of FIG. 3, the control unit 11 executes the transport unit 16 to continuously or intermittently transport the clothing fabric 30 for imaging of the clothing fabric 30 and printing on the clothing fabric 30 at least during the periods of step S110 to S160. Accordingly, the printing method of the present embodiment includes a transport step for transporting the clothing fabric 30.

In step S120, the pattern extracting unit 12*b* extracts the pattern region corresponding to the pattern of the clothing fabric 30 in the imaged image data based on the contrast between the pattern image data registered in step S100 with the imaged image data generated by the imaging of step S110. Step S120 corresponds to an extraction step. In the imaged image data, which is the imaging result of the target region of the clothing fabric 30, a plurality of patterns are represented side by side. Therefore, the pattern extracting unit 12*b* extracts the pattern region for each pattern that is represented side by side in the imaged image data.

The pattern extracting unit 12*b* may extract an image region having a degree of similarity with the pattern image data that is greater than a predetermined level as the pattern region in the imaged image data using image recognition techniques. Specifically, the pattern extracting unit 12*b* extracts the edge of the image in the pattern image data, and similarly extracts the edge of the image in the imaged image data. Then, the distribution of edges in the pattern image data is repeatedly compared while shifting the position with respect to the distribution of the edges in the imaged image data, and while deforming the pattern image data, a region in which the degree of match between the distribution of edges is a high evaluation not less than a predetermined value is extracted as one pattern region. With the processing described above, the pattern extracting portion 12*b* extracts a plurality of pattern regions from the imaged image data.

Extracting the plurality of Extracting a plurality of pattern regions from the imaged image data represented in the two-dimensional coordinate is also to identify the coordinates of the corners of each pattern region in the imaged image data.

As with the processing of step S120, in step S106 described above, the pattern registration unit 12*a* can extract the pattern regions in the pre-scan data according to the degree of match of the distribution of edges between the contrasting images.

In step S130, the correction processing unit 12*c* corrects the colored image data representing the image to be printed overlapping the pattern of the fabric 30 in a way of matching the shape of the pattern region extracted in step S120. The colored image data corresponds to "third image data" and step S130 corresponds to a correction step. The colored image data is pre-generated colored image data representing a color or color print range to be colored in one pattern. The colored image data is stored in advance in the storage unit 18, for example. Alternatively, for example, from a PC external to the printing apparatus 10, the control unit 11 inputs colored image data stored in the PC according to the user operation, and stores the inputted colored image data in the storage unit 18.

The shape of the colored image data is an ideal shape of a region including one pattern, for example a rectangle. On the other hand, the shape of each pattern region extracted from the imaged image data in step S120 may be accompanied by stretching or distortion due to the stretching and distortion of the clothing fabric 30 to be transported, and there is no necessary to coincide with the shape of the colored image data. Thus, the correction processing unit 12c deforms the shape of the colored image data according to the individual shapes of the pattern regions extracted in step S120. Examples of the deformation method include affine transformation including magnification, minification, rotation, shearing, and the like of an image, and other methods of deformation. Such deformation is a correction by step S130.

In step S140, the printing control unit 12d generates the combined image data by arranging the plurality of colored image data after correction in step S130. The printing control unit 12d executes image processing including division and combination of image data to generate the combined image data in step S140. Such image processing is referred to as "specific image processing" for convenience. In other words, the printing control unit 12d is subject to specific image processing of the colored image data subjected to the correction in step S130. Furthermore, the specific image processing corresponds to an image processing step.

Figure 5:
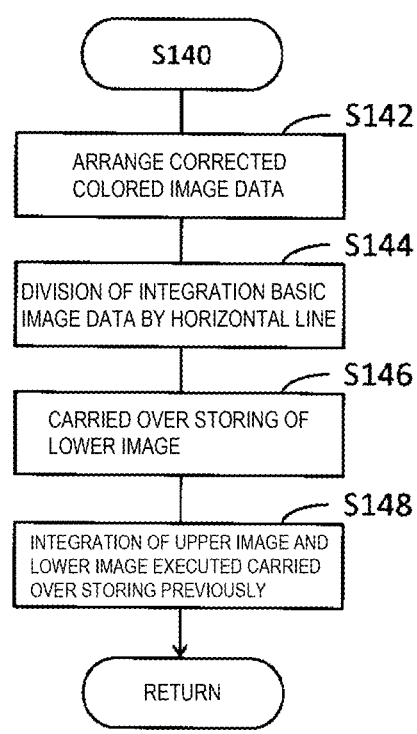
FIG. 5 is a flowchart illustrating details of step S140.

FIG. 5 illustrates the details of step S140 by flowchart.

In step S142, the printing control unit 12d generates image data as a basis for combined image data by arranging the plurality of colored image data corrected as described above according to the shape of each of the pattern regions in the imaged image data in correspondence with the arrangement of the plurality of pattern regions in the imaged image data. The image data generated in step S142 is referred to as "combination basic image data" for convenience. Since the corrected colored image data is deformed, it is essentially not rectangular. Accordingly, the shape of the combination basic image data generated by arranging the plurality of colored image data after correction is also said to be non-rectangular.

In step S142, the printing control unit 12d acquires image data as the target of the n-th specific image processing. The number n is a positive integer. At least steps S144, S146, S148 in FIG. 5 correspond to specific image processing. The number of specific image processing is the same as the number of times the step S140 is executed. Accordingly, in step S140, which is executed first after the start of the flowchart of FIG. 3, an n=1, or first specific image processing is executed.

In step S144, the printing control unit 12d generates an upper image whose lower side is horizontal and a lower image whose upper side is horizontal by dividing the combination basic image data generated in step S142 using horizontal line. Here, each image data processed by the control unit 11 in steps S100 to S150 is an image represented by two-dimensional coordinates of an X axis and a Y axis orthogonal to each other, and the direction of the X axis corresponds to, for example, the direction D3, and the direction of the Y axis corresponds to the direction opposite to the transporting direction D1. Furthermore, the up and down orientation of each image data processed in steps S100 to S150 will be described by imaging an orientation corresponding to the transport direction D1 as "upper", and an orientation corresponding to the reverse direction of the transport direction D1 (the Y-axis direction) as "lower". The horizontal line dividing the combination basic image data is a line parallel to the X-axis. According to step S144, the combination basic image data is separated into an upper image whose lower side is horizontal and a lower image whose upper side is horizontal.

In step S146, the printing control unit 12d stores the lower image generated in step S144, that is, the lower image generated by the division of step S144 in the n-th specific image processing, in the storage unit 18. The lower image stored in step S146 is carried over to the next specific image processing and used for combining with the upper image that is generated in the next specific image processing. Thus, the storage of the lower image according to step S146 is referred to as "carried over storing".

In step S148, the printing control unit 12d combinecombines a lower image the carried over storing in step S146 in the previous specific image processing to the upper side of the upper image generated in step S144. In other words, the upper image generated by the division in step S144 in the n-th specific image processing and the lower image generated by the division of step S144 in the (n−1)-th specific image processing are combined to each other. As a result, the horizontal image data or the combined image data is generated on the upper side and the lower side.

In the specific image processing, the order of execution of steps S146 and S148 may be opposite to the order illustrated in FIG. 5. Alternatively, in the specific image processing, steps S146 and S148 may be executed simultaneously. Through the above steps, step S140 ends. The printing control unit 12d adds "1" to the current n each time step S140 is ended.

Return to the description of FIG. 3.

In step S150, the printing control unit 12d causes the printing unit 17 to execute printing on the clothing fabric 30 based on the combined image data generated in step S140. Step S150 corresponds to a printing step for executing printing based on image data after the specific image processing. The printing control unit 12d converts the combined image data to printing data by executing each necessary processing such as a so-called color conversion processing or a halftone process. The printing data is an image in which the upper side and the lower side are horizontal. Then, the printing control unit 12d transports the printing data to the printing unit 17, and sets the printing data as the imaging target of the clothing fabric 30 in step S110, and causes the printing unit 17 to start printing by the movement of the carriage 20 and ink discharge from the print head 19 based on the printing data at a predetermined timing at which the unprinted region has reached under the print head 19. As a result, the colored image represented by the individual colored image data constituting the bonded image data is printed overlapping the pattern in a manner that matches the stretching and distortion of the individual patterns in the fabric 30.

In the transport unit 16, it is provided with an encoder that detects the amount of rotation of rollers and belts rotating for transport. The control unit 11 calculates and grasps the transport distance of the current clothing fabric 30 according to the detection signal from the encoder. Accordingly, the control unit 11 can grasp the position of the target region in the transport direction D1, at the timing an unprinted area including target region comes below the print head 19, the printing unit 17 can start printing on the region.

In step S160, the control unit 11 determines whether the printing is ended, when the printing is ended, determines "Yes" and terminates the flowchart of FIG. 3. The control unit 11 determines the printing is ended when, for example, the instruction of terminate the printing from the user is received, or if the printing is ended on the length of the clothing fabric 30 that was scheduled in the transport direction D1. Of course, even if it is determined to be "Yes" in step S160 and the flowchart of FIG. 3 is ended, the control unit 11 controls, for example, the necessary processing such as collecting the clothing fabric 30 by the windup roller, and then stops the transport unit 16.

On the other hand, when the printing does not end, the control unit 11 determines "No" in step S160 and repeats the processing after step S110. That is, the subsequent processing of step S110 is executed on the next target region adjacent to the upstream to the previous target region on the clothing fabric 30. Note that, in consideration of the imaging unit 15 being located upstream of the printing unit 17, the imaging unit 15 is capable of imaging a region upstream of the region of the currently printed fabric 30 in parallel with printing by the printing unit 17. As a result, at a timing when printing on the target region is ended by step S150, imaging by the imaging unit 15 related to the next target region may be ended. Accordingly, at the timing that it is determined "No" in step S160, when the imaging by the imaging unit 15 of the next target region has been ended, the control unit 11 may execute the processing after step S120.

Alternatively, the control unit 11 may be configured to not simultaneously execute the imaging of the clothing fabric 30 by the imaging unit 15 and the printing of the clothing fabric 30 by the printing unit 17, and, if the control unit 11 determines "No" in step S160, the transport unit 16 is caused to feed the clothing fabric 30 backward, and an unprinted region of the clothing fabric 30 is returned to the upstream position of the imaging unit 15. The back feed is a transport in a downstream to upstream direction. Then, the control unit 11 may restart the processing after step S110 after the back feed of the clothing fabric 30.

Figure 6:
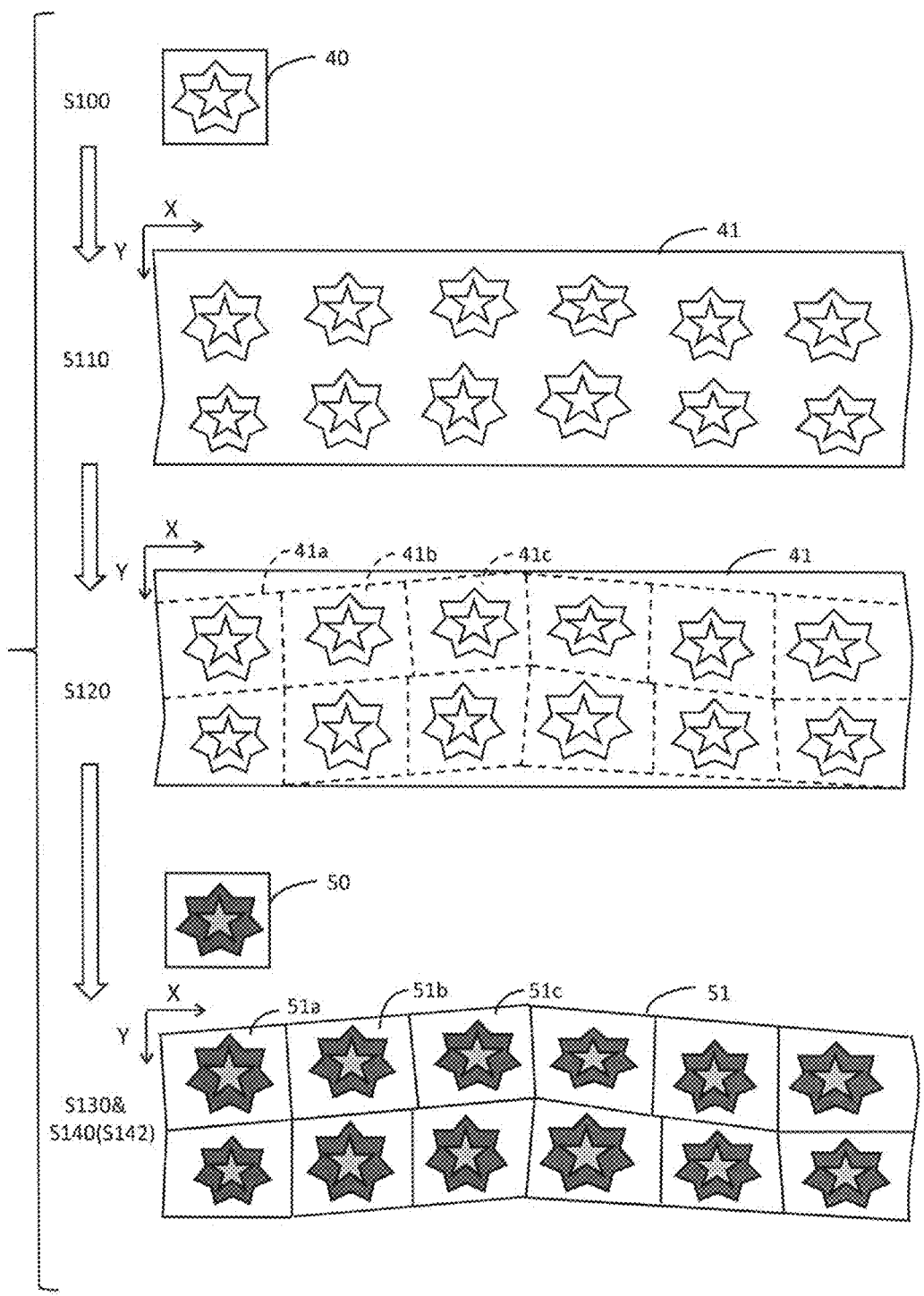
FIG. 6 is a diagram for explaining an embodiment with a specific example.
Figure 7:
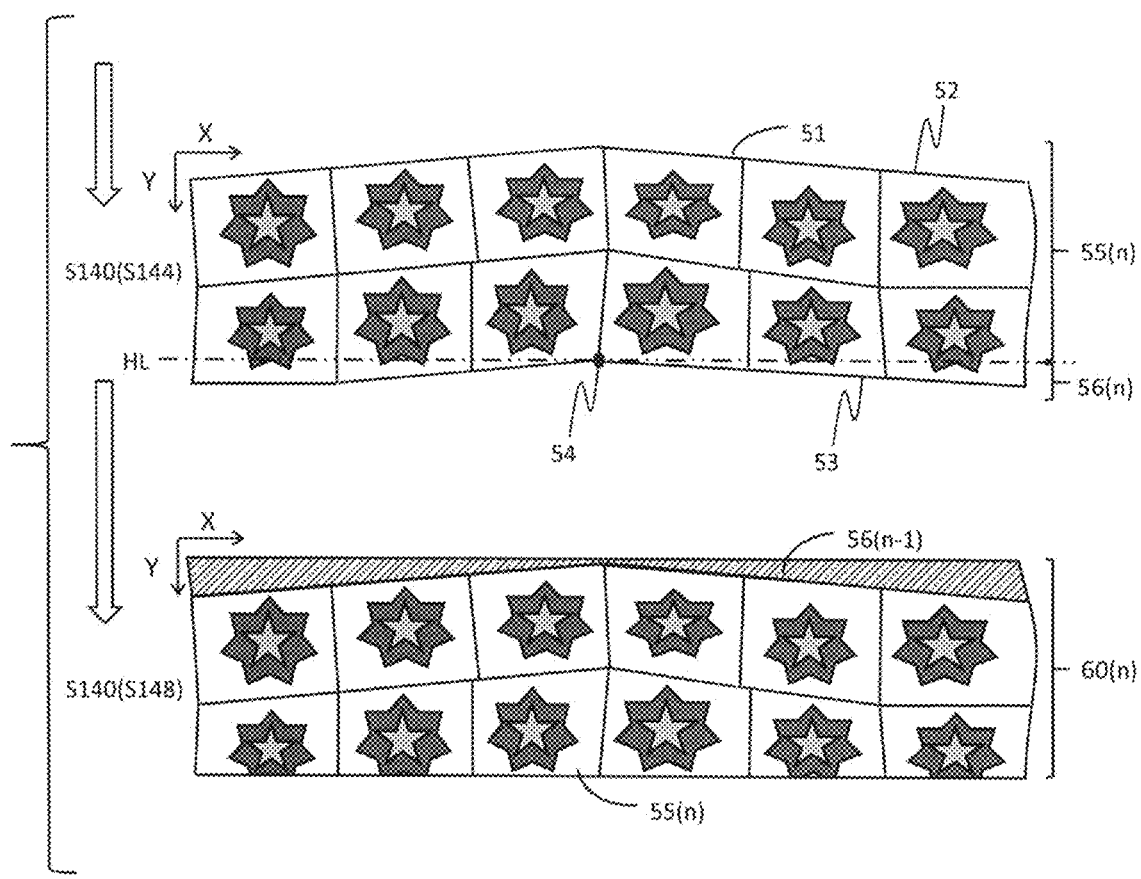
FIG. 7 is a diagram illustrating the present embodiment with a specific example following FIG. 6.

FIG. 6 and FIG. 7 are diagrams for explaining a portion of the flowchart of FIG. 3 according to a specific example. FIG. 7 may be understood as a continuation of FIG. 6. In step S100, the pattern registration unit 12a registers the pattern image data 40 into the storage unit 18. In the example of FIG. 6, the pattern image data 40 is image data representing a pattern designed with a petal shape as a motif.

In step S110, the target region of the clothing fabric 30 is imaged by the imaging unit 15, and as a result, the imaged image data 41 is obtained. If stretching or distortion occurs in the clothing fabric 30, each of the patterns represented in the imaged image data 41 also assumes a state of stretching or distortion.

In step S120, the pattern extracting unit 12b extracts the pattern region in the imaged image data 41 by comparing the pattern image data 40 with the imaged image data 41. In the example of FIG. 6, each of the regions separated by the dashed line in the imaged image data 41 is each pattern region in which the pattern extracting unit 12b has been extracted for each pattern. In FIG. 6, a pattern region which is a part of a plurality of pattern regions within the imaged image data 41 is indicated by sign 41a, 41b, 41c.

In step S130, the correction processing unit 12c corrects the colored image data 50 to match the shape of each pattern region of the imaged image data 41. In step S142 of the step S140, the printing control unit 12d generates the combination basic image data 51 by arranging the corrected plurality of colored image data 50 corresponding to the arrangement of the pattern regions in the imaged image data 41.

According to the example of FIG. 6, sign 51a denotes the colored image data 50 corrected for matching the shape of the pattern region 41a. Similarly, the sign 51b denotes the colored image data 50 corrected for matching the shape of the pattern region 41b, and sign 51c is the colored image data 50 corrected for matching the shape of the pattern region 41c. The combination basic image data 51 is image data in which such corrected colored image data 51a, 51b, 51c, . . . , is arranged as a sequence of the pattern regions 41a, 41b, 41c, . . . . Further, the combination basic image data 51 is image data that is a target of the n-th specific image processing.

In step S144 of the step S140, the printing control unit 12d divides the combination basic image data 51 by a horizontal line HL and separates the combination basic image data 51 into the upper image 55 and the lower image 56 as illustrated in FIG. 7. In FIG. 7, the horizontal line HL is indicated by a two-dot dashed line. With respect to the description of FIG. 7 and the like, characters attached in parenthesis of the upper image 55, the lower image 56, and the combined image data 60 indicated how many times the image is generated by the specific image processing.

According to the example of FIG. 7, both the upper side 52 and the lower side 53 of the combination basic image data 51 are not horizontal. According to the example of FIG. 7, printing control unit 12d divides the combination basic image data 51 using the horizontal line HL passing through a point 54 closest to the upper side 52 of the lower side 53 of the combination basic image data 51. The upper image 55 (n) generated by such a division is horizontal on the lower side and the upper side of the lower image 56 (n) are horizontal.

Note that, when the lower side 53 of the combination basic image data 51 is occasionally horizontal, even if the combination basic image data 51 is divided by the horizontal line HL passing through the point 54 close to the upper side 52 of the lower side 53, the lower image 56 does not substantially generate from the combination basic image data 51, and the combination basic image data 51 becomes the upper image 55 as it is. Although not particularly illustrated in FIG. 7, if the lower image 56 (n) occurs as a result of step S144, the printing control unit 12d executes the carried over storing on the lower image 56 (n) at step S146. This lower image 56 (n) is used for combination in step S148 of the next step S140.

On the other hand, when the lower image 56 (n) does not occur as a result of step S144, printing control unit 12d is unable to executes the carried over storing of the lower image 56 (n) at step S146. In this case, the image is not combined at step S148 of the next step S140, and the upper image 55 is processed as the combined image data 60 at that time, and there is no problem. This is because that in one certain step S140, the lower image 56 for combining with the upper image 55 generated in step S144 is not executed carried over storing from the previous step S140 means that not only the lower side but also the upper side of the upper image 55 is horizontal, and it can be said that the shape is suitable for the printing in step S150.

In step S148 of the step S140, printing control unit 12d generates the combined image data 60(n) whose upper side and lower side are horizontal by combining the lower side of the lower image 56 (n−1) whose upper side is horizontal on the upper side 52 of the upper image 55 (n). The lower image 56 (n−1) is a lower image whose upper side is horizontal and is generated in step S144 in the (n−1)-th specific image processing, and is executed carried over storing in step S146 of the (n−1)-th specific image processing. In FIG. 7, the range of the lower image 56 (n−1) is illustrated with hatching, but this hatching does not represent the color or the pattern of the lower image 56 (n−1). The lower side of the lower image 56 (n−1) and the upper side 52 of the upper image 55 (*n*) coincide because it can be said to be the boundary line between corrected colored image data adjacent in the Y-axis direction.

The combined image data 60 (*n*) generated by this way is printed on the clothing fabric 30 in the n-th step S150.

Although the combined image data 60 (*n*) illustrated in FIG. 7 has distortion and/or breakage each of whose side of both ends of the X axis is not parallel to the Y axis, the printing control unit 12*d* may advance the processing to step S150 by adding blank data to both ends of the combined image data 60 (*n*), after the entire combined image data 60 (*n*) is arranged as a rectangular shape.

Also, in step S148 of the first step S140, there is no lower image 56 (0) for combining to the upper image 55 (1). Thus, in step S148 of the first step S140, the printing control unit 12*d* may generate the combined image data 60 (1) in which the upper side and the lower side are horizontal by adding white data having the horizontal upper side to the upper side of the upper image 55 (1) and advance the processing to step S150.

3. Summary:

As described above, according to the present embodiment, the printing apparatus 10 includes a control unit 11 configured to execute image processing (specific image processing) including division and combination of image data, and a printing unit 17 configured to perform printing on the printing medium based on the image data after the image processing. Then, the control unit 11 acquires image data as a target of the n-th image processing, generates an upper image whose lower side is horizontal and a lower image whose upper side is horizontal by dividing the image data by a horizontal line, generates the combined image data whose the upper side and the lower side are horizontal by combining a lower image whose upper side is horizontal and that is generated by division in image processing at the (n−1)-th time, on the upper side of the upper image, and causes the printing unit 17 to execute printing based on the combined image data.

According to the configuration, the control unit 11 repeats the following steps: acquiring image data, combining the upper image divided by the horizontal line from the image data and the lower image generated in the previous image processing, generating combined image data in which the upper side and the lower side are horizontal, and supplying the combined image data the printing unit 17. As a result, even if the image data acquired by the control unit 11 is an image data having a distorted shape in which the upper side and the lower side are not horizontal, the printing unit 17 can execute printing based on image data having a certain shape suitable for printing with the upper side and the lower side being horizontal. Note that the control unit 11 stores the lower image generated by the division in the n-th image processing in the predetermined storage unit 18.

For the printing unit 17 configured to execute printing by ink discharge from the printing head 19 that moves in the width directions D2 and D3 on the carriage 20, it is preferable that an image (print data) having a shape in which the upper side facing downstream and the lower side facing upstream in the transport direction D1 are parallel with the width directions D2 and D3 is set as a processing unit, and is acquired from the control unit 11 repeatedly and then prints on the printing medium. According to the present embodiment, the combined image data that is horizontal on the upper side and the lower side is an image having an upper side and a lower side parallel with such width directions D2 and D3. As a result, appropriate printing by the printing unit 17, that is, high-quality printing in which a defect such as a gap or a deviation and the like of an image is less likely to occur is executed. In addition, according to the present embodiment, complex transport control and the like of the printing medium necessary for printing image data in which upper side and lower side are inclined or distorted relative to the width directions D2 and D3, for each pass of the print head 19, is omitted.

Moreover, according to the present embodiment, the control unit 11 may divide the image data by a horizontal line passing through a point closest to the upper side of the lower side of the image data.

According to the above-described configuration, even if the image data acquired as the target of the image processing has a shape in which the lower side is not horizontal, the image data can be appropriately separated into an upper image in which the lower side is horizontal and a lower image in which the upper side is horizontal and the lower side is not horizontal.

However, the control unit 11 may divide the image data using horizontal line passing through a point closer to the upper side than a point which is the closest to the upper side of the lower side of the image data.

In addition, according to the present embodiment, the printing apparatus 10 includes a transport unit 16 configured to transport clothing fabric 30, which is the printing medium where a pattern is formed, and an imaging unit 15 configured to image the clothing fabric 30 transported by the transport unit 16. Then, the control unit 11 extracts a pattern region corresponding to the pattern in the second image data based on a comparison between the first image data (pattern image data) representing the pattern and second image data (imaged image data) generated by the imaging of the clothing fabric 30 by the imaging unit 15, and corrects third image data (colored image data) representing an image to be printed overlapping the pattern so that the third image data matches the shape of the pattern region, and the corrected third image data is set as a target of the image processing (specific image processing). Setting the corrected third image data as a target of the specific image processing includes setting a set of corrected third image data (combination basic image data 51) as the target of the specific image processing.

According to the configuration, the printing apparatus 10 corrects the colored image data according to the shape of the pattern region extracted by comparing the pattern image data with the imaged image data, and prints the corrected colored image data on the clothing fabric 30. In this way the image represented by the colored image data is printed in the form that is according to the expansion or distortion of the pattern in the clothing fabric 30 and without being shifted from the pattern of the clothing fabric 30. In addition, by setting the colored image data corrected according to the shape of the pattern region as the target of the specific image processing, it is possible to repeat executing printing which is set as a unit of combined image data of combined image data with the upper side and the lower side horizontal for the clothing fabric 30 being transported.

In addition, according to the above description, the present embodiment discloses a printing method includes an image processing step for executing image processing including division and combination of image data, and a printing step of performing printing on a printing medium based on the image data after the image processing, in the image processing step, the image data as a target of the n-th image processing is acquired, an upper image whose lower side is horizontal and a lower image whose upper side is horizontal are generated by the division of the image data by a horizontal line, and an combined image data whose upper side and lower side are horizontal is generated by combining a lower image whose upper side is horizontal, which is generated by division in the (n−1)-th image processing, on an upper side of the upper image, in the printing step, the printing based on the combined image data is performed.

The program 12 for causing a computer to execute the above-described method and the memory in which the program 12 is stored can be understood as the disclosure.

In the example of FIG. 2A, a configuration of a serial printer is disclosed in which the print head 19 is mounted on the carriage 20 and moves, the print head 19 may be a so-called line type head. That is, the print head 19 may be an elongated print head that is not mounted on the carriage 20 and that can cover the width of the clothing fabric 30 along the width directions D2 and D3.

In FIG. 2A and FIG. 2B, the configuration indicated by sign 22 is not an endless belt, but may be a platen as a platform that supports the clothing fabric 30 from below. That is, it may be understood that the clothing fabric 30 transported by a roller which is not illustrated moves over the platen.

The specific image processing according to the present embodiment is not limited to a scene in which corrected colored image data is acquired according to the shape of the pattern region in the clothing fabric 30, and is effective by being applied when the image data having some distortion is acquired and printed. Also, the printing medium is not limited to the clothing fabric 30, and any printing medium such as paper or the like can be used.

What is claimed is:

1. A printing apparatus comprising:
   a control unit configured to execute an (n−1)-th image processing and an n-th image processing that is next to the (n−1)-th image processing, each of the (n−1)-th image processing and the n-th image processing including division and combination of image data, n being a positive integer and 2 or more,
      acquiring (n−1)-th image data as a target of the (n−1)-th image processing and n-th image data as a target of the n-th image processing,
      generating an (n−1)-th upper image having a horizontal lower side and an (n−1)-th lower image having a horizontal upper side for the (n−1)-th image data by dividing the (n−1)-th image data by a first horizontal line,
      generating an n-th upper image having a horizontal lower side and an n-th lower image having a horizontal upper side for the n-th image data by dividing the n-th image data by a second horizontal line different from the first horizontal line,
      generating combined image data having a horizontal upper side and a horizontal lower side by combining the (n−1)-th lower image of the (n−1)-th image data, which is generated by the dividing of the (n−1)-th image data in the (n−1)-th image processing, to the upper side of the n-th upper image of the n-th image data, which is generated by the dividing of the n-th image data in the n-th image processing, and
      causing the printing unit to execute printing based on the combined image data; and
   a printing unit configured to perform printing on a printing medium based on the combined image data after the n-th image processing;
   a transport unit configured to transport clothing fabric that is the printing medium where a pattern is formed; and
   an imaging unit configured to image the clothing fabric transported by the transport unit, wherein
   based on a comparison between first image data representing the pattern and second image data generated by the imaging of the clothing fabric by the imaging unit, the control unit extracts a pattern region in the second image data corresponding to the pattern,
   the control unit corrects third image data representing an image to be printed overlapping the pattern so that the third image data matches a shape of the pattern region, and
   the corrected third image data is set as a target of the n-th image processing.

2. The printing apparatus according to claim 1, wherein the control unit divides the (n−1)-th image data by the first horizontal line passing through a first point, which is closest to the upper side of the (n−1)-th image data, on the lower side of the (n−1)-th image data, and
   the control unit divides the n-th image data by the second horizontal line passing through a second point, which is closest to the upper side of the n-th image data, on the lower side of the n-th image data, and the second point is different from the first point.

3. A printing method comprising:
   an (n−1)-th image processing and an n-th image processing next to the (n−1)-th image processing, each of the (n−1)-th image processing and the n-th image processing including division and combination of image data, n being a positive integer and 2 or more, the executing being performed by
      acquiring (n−1)-th image data as a target of the (n−1)-th image processing and n-th image data as a target of the n-th image processing,
      generating an (n−1)-th upper image having a horizontal lower side and an (n−1)-th lower image having a horizontal upper side for the (n−1)-th image data by dividing the (n−1)-th image data by a first horizontal line,
      generating an n-th upper image having a horizontal lower side and an n-th lower image having a horizontal upper side for the n-th image data by dividing the n-th image data by a second horizontal line different from the first horizontal line, and
      generating combined image data having a horizontal upper side and a horizontal lower side by combining the (n−1)-th lower image of the (n−1)-th image data, which is generated by the dividing of the (n−1)-th image data in the (n−1)-th image processing, to the upper side of the n-th upper image of the n-th image data, which is generated by the dividing of the n-th image data in the n-th image processing; and
   performing printing on a printing medium based on the combined image data after the n-th image processing;
   transport, by a transport unit, clothing fabric that is the printing medium where a pattern is formed;
   imaging, by an imaging unit, the clothing fabric transported by the transport unit;
   extracting, based on a comparison between first image data representing the pattern and second image data generated by the imaging of the clothing fabric by the imaging unit, a pattern region in the second image data corresponding to the pattern;
   correcting third image data representing an image to be printed overlapping the pattern so that the third image data matches a shape of the pattern region; and setting the corrected third image data as a target of the n-th image processing.

\* \* \* \* \*